United States Patent [19]
Pentz et al.

[11] 3,797,664
[45] Mar. 19, 1974

[54] SLUDGE REMOVAL APPARATUS

[75] Inventors: Howard L. Pentz; Chandrakant Parkhani, both of Lansdale; Frank Majeron, Philadelphia, all of Pa.

[73] Assignee: FMC Corporation, San Jose, Calif.

[22] Filed: Jan. 12, 1972

[21] Appl. No.: 217,379

[52] U.S. Cl............. 210/83, 210/112, 210/527
[51] Int. Cl............................................. B01d 21/02
[58] Field of Search........ 137/140, 142, 150, 150.5, 137/152, 153, 577, 590; 210/66, 67, 83, 96, 103, 104, 197, 523, 525, 527–531, 112

[56] References Cited
UNITED STATES PATENTS

| | | | |
|---|---|---|---|
| 2,236,128 | 3/1941 | Poole | 210/531 |
| 3,669,271 | 6/1972 | McGivern | 210/527 X |
| 3,106,933 | 10/1963 | Kloppel | 210/96 X |
| 2,966,268 | 12/1960 | Lind et al. | 210/83 |
| 2,980,934 | 4/1961 | Steindorf | 210/523 X |
| 1,947,429 | 2/1934 | Townsend et al. | 210/83 |
| 3,166,502 | 1/1965 | Kelly | 210/528 |

Primary Examiner—Samih N. Zaharna
Assistant Examiner—Robert H. Spitzer
Attorney, Agent, or Firm—Dressler, Goldsmith, Clement & Gordon, Ltd.

[57] ABSTRACT

A method and apparatus for removing settled solids from the bottom of a sedimentation tank is disclosed in this application. The apparatus consists of a bridge that is supported for reciprocal movement on the tank and has eduction means for the settled solids depending therefrom. The drive means for the traveling bridge includes speed control means to vary the speed of the bridge to maintain a substantially uniform solids concentration in the sludge flowing through the eduction means at a substantially constant flow rate. In one embodiment, the eduction means consists of a plurality of transversely aligned inverted T-shaped tubes, each of which has a plurality of spaced openings along the bottom thereof. A deflecting plate is pivoted intermediate opposite edges below the openings and is moved between first and second positions to direct the sludge towards the openings in either direction of travel of the bridge. In an alternate embodiment, the eduction means consists of first and second longitudinally spaced inverted T-spaced eduction tubes, each of which has one set of openings and a deflecting plate fixed to the horizontal portion of the tube. One set of openings and a deflecting plate are directed towards one end of the tank while the second set of openings and the second deflecting plate are directed towards the opposite end so that one eduction tube collects sludge as the bridge travels in the one direction and the second eduction tube collects sludge as the bridge is traveling in the opposite direction.

19 Claims, 11 Drawing Figures

PATENTED MAR 19 1974 3,797,664
SHEET 1 OF 3
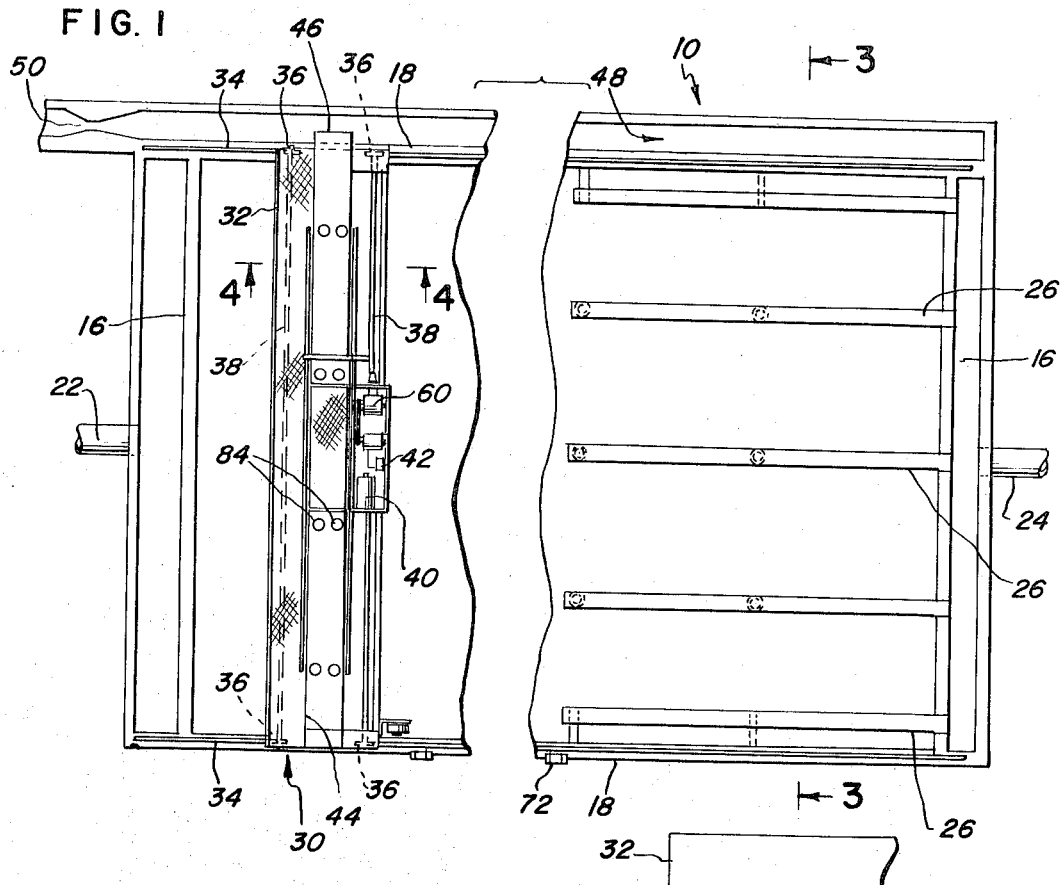
FIG. 1
FIG. 2
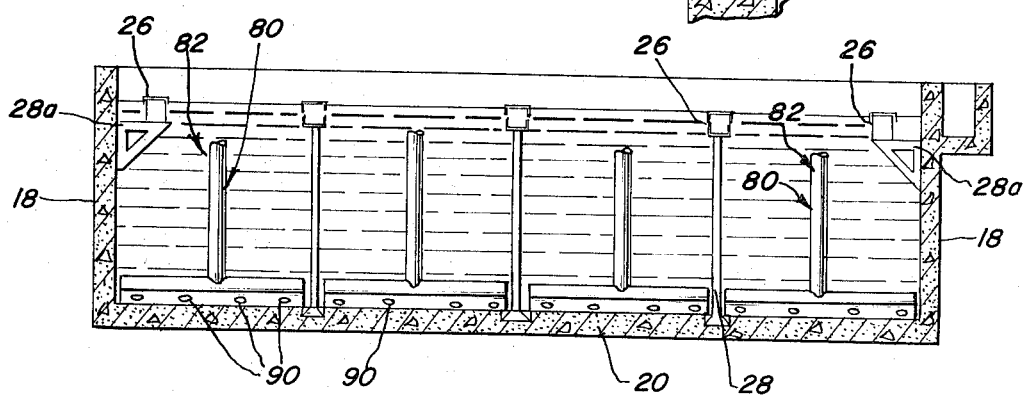
FIG. 3

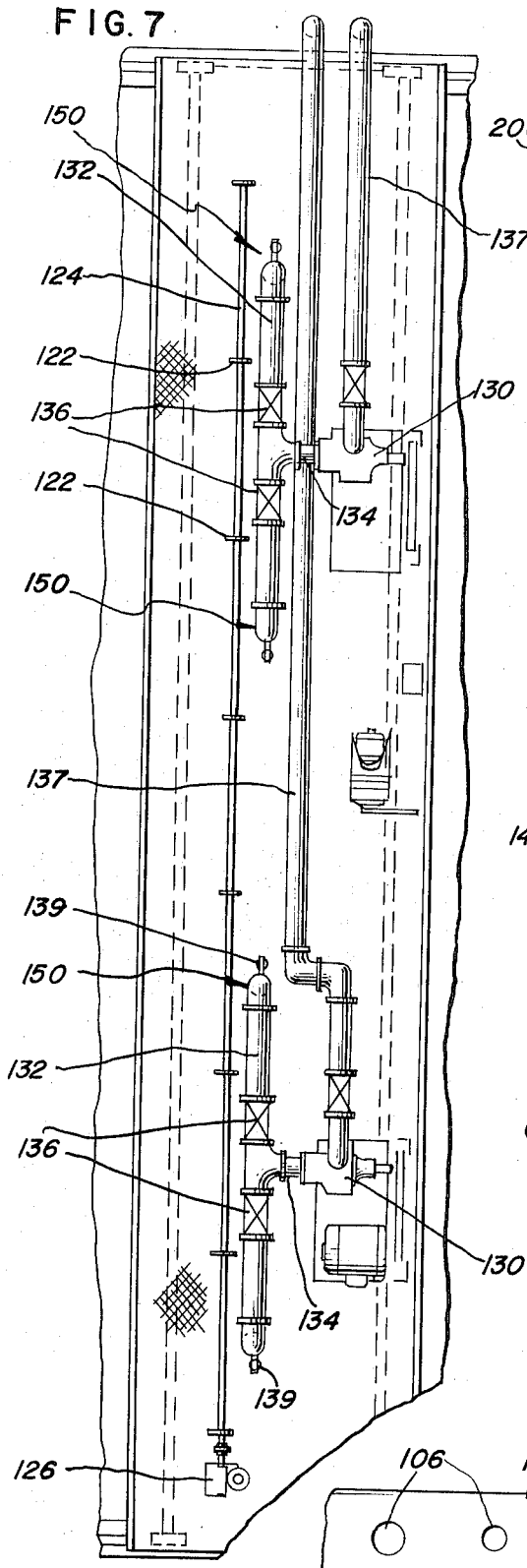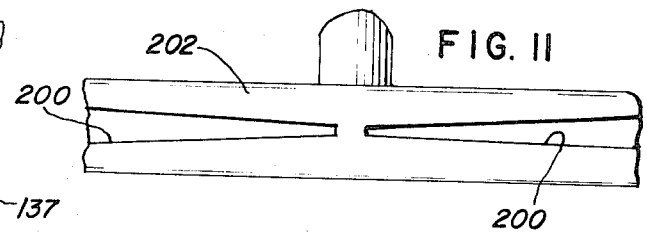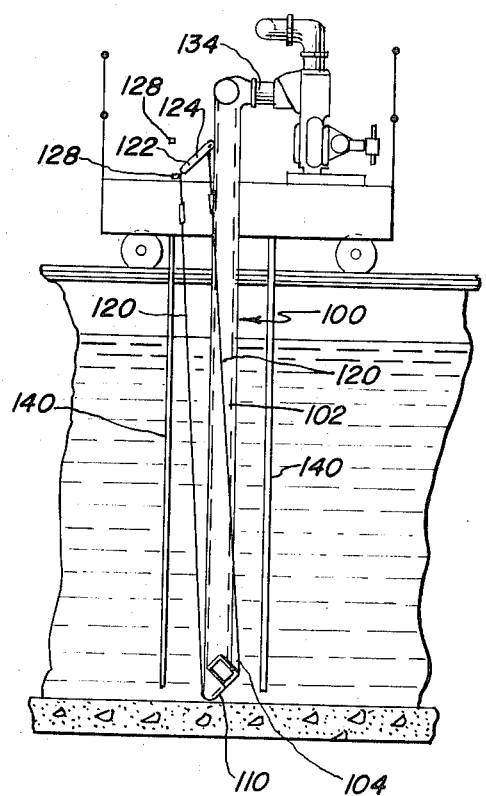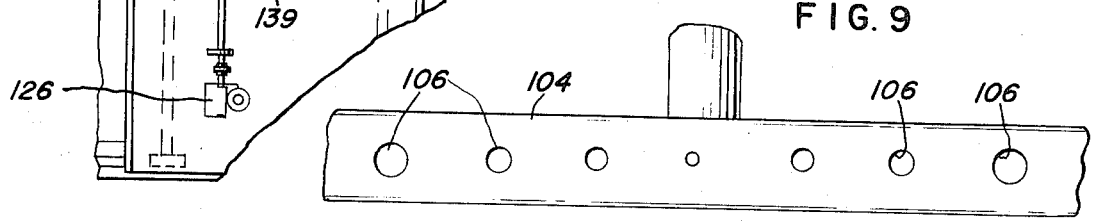

SLUDGE REMOVAL APPARATUS

BACKGROUND OF THE INVENTION

In the treatment of sewage or the like, it is customary to utilize clarification or sedimentation tanks to effect separation of liquids and solids during the sewage treatment operation. In many instances, the solids that are settled and collected are returned to an aeration tank for further processing and treatment. The material that is returned to the aeration tank may be called activated sludge which consists of a certain percentage of solids and a portion of liquid. In the activated sludge process, it has been found that rapid return of sludge of uniform solids concentration to the aeration tank significantly increases treatment efficiency.

For many years, the settled solids that are deposited on the bottom of a clarification or sedimentation tank have been removed through a scraping process in which scrapers are utilized for moving the material to hoppers or troughs located in the bottom of the tank. This method of removal does not accomplish rapid return of sludge of uniform solids concentration.

In order to overcome this problem, numerous proposals have been made to withdraw the solids that form a sludge layer at the point of deposit through some type of suction device. An example of one such suction device that is utilized in a circular tank is shown in Lind et al. U.S. Pat. No. 2,966,268.

Because of the large amount of space required for circular tanks, it has become desirable in recent years to utilize tanks of other configurations that require less ground area. Thus, the most common type of alternate to a circular tank is a rectangular sedimentation tank that can be installed in a minimum area. However, the rectangular sedimentation tank created additional problems in removing settled solids at the point of withdrawal. One prior art unit for removing settled solids from a rectangular tank is shown in McGivern et al. U.S. Pat. No. 3,333,704. In this patent, a plurality of depending inverted T-shaped tubes are supported on a floating bridge and each tube has downwardly opening inlets spaced along the length thereof through which the settled solids may be withdrawn by a siphon process.

The major problem encountered in the device of the type shown in the McGivern et al. patent is that there is no accurate control of the amount of solids that are withdrawn from the bottom of the tank. It will be appreciated that all of the solids that are removed by the apparatus disclosed in this patent must be removed on the basis of the siphonic action that is applied to the individual tubes. It has been found that removal of solids through spaced openings in the bottoms of the tubes will result in removing only a small portion of the solids in the area surrounding the openings.

Thus, there remains a need for a simple and effective manner of removing the entire sludge layer that includes settled solids and associated liquid from the bottom of rectangular sedimentation tanks.

BRIEF SUMMARY OF THE INVENTION

The present invention consists of an improved method and apparatus for withdrawing sludge at a constant flow rate with uniform solid concentration in the sludge regardless of the depth of sludge layer in the bottom of a tank. The sludge layer may be defined as the depth of settled solids and surrounding liquid that has filled the voids between the settled solids while sludge is a combination of a certain percentage of settled solids and surrounding or associated liquid that commingle to form a mixture with fluid properties. Uniform solids concentration as used herein means a constant ratio of solids, by weight, in the sludge.

The sludge is removed continuosly in a rectangular tank at a point where the solids settle to the floor, thereby eliminating the chances of resuspension due to any mechanical agitation while insuring that all of the settled solids are removed during each pass of the eduction means between opposed sides of the tank. The apparatus for accomplishing the above can readily be designed to span virtually any width of tank resulting in a highly versatile system that can be incorporated into waste treatment plants that require relatively high flow rates.

The apparatus for accomplishing the above consists of a traveling bridge that is supported for movement between opposed sides of a rectangular tank that has an inlet for receiving solid entrained liquids and an outlet for receiving clarified liquids while the solids are deposited by gravity on the bottom of the tank. The traveling bridge is reciprocated by drive means that consist of a reversible variable speed motor and speed control means cooperating with the motor for moving the bridge at a rate of speed that is inversely proportional to the depth of the sludge layer that has accumulated on the tank bottom since the last pass of the bridge.

With this construction, sludge, consisting of settled solids and a percentage of liquid, is withdrawn at a uniform rate and the speed of the bridge is controlled so as to maintain a uniform solids concentration, i.e., a constant ratio of settled solids and liquid in the sludge, at all times. In one embodiment of the invention, the speed of the bridge is at a maximum as the bridge moves away from one end of the tank and is progressively decreased in spaced steps along the path of travel towards the opposite end. The apparatus for accomplishing the decrease of speed of the bridge include a plurality of cams spaced along the path of travel of the bridge, with a speed changing limit switch carried by the bridge and having an acutator arm actuated by each of the cams. In an alternate embodiment, the speed of the bridge is changed as a function of the depth of the layer of sludge deposited on the floor.

According to another aspect of the invention, the eduction means utilized with the traveling bridge is capable of removing all of the settled solids during each pass of the bridge between opposite side walls of the tank. The eduction means depends from the bridge along a substantially vertical plane and has a horizontal portion adjacent the bottom of the tank. The horizontal portion has a plurality of spaced openings for receiving sludge and the eduction means further includes deflecting means below the horizontal portion. The deflecting means has leading edges located on opposite sides of the vertical plane for directing settled solids towards at least some of the openings in each direction of travel of the bridge.

In one embodiment, the eduction means consists of first and second inverted T-shaped tubes located on opposite sides of the vertical plane with a deflecting plate fixed to the horizontal portion of each of the tubes and openings adjacent each of the deflecting plates. The openings and deflecting plates on the respective horizontal portions are respectively directed towards the opposite sides of the tank adjacent the opposite ends of travel of the bridge. This arrangement eliminates the need for any moving parts below the liquid level of the tank.

It is also comtemplated that a plurality of sets of inverted tubes can be utilized and spaced along the length of the bridge so that the clarification apparatus is capable of being utilized in extremely large tanks having a dimension transversely of the path of the traveling bridge which is in excess of what is heretofore considered to be a maximum dimension.

In a slightly modified form of the invention, the eduction means consists of a single inverted T-shaped tube that depends from the bridge along a vertical plane and has openings on opposite sides of the plane along the bottom of the horizontal portion. A deflecting plate is pivoted intermediate opposite edges about a fixed pivot axis located below the horizontal portion or tube and is moved between first and second positions to deflect settled solids towards the openings as the bridge is traveling in opposite directions. In this embodiment, it is preferable that the position of the deflecting plate be reversed by the reversing mechanism for the traveling bridge. Again, any number of tubes can be aligned with each other in a direction perpendicular to the direction of movement of the bridge.

In both embodiments of the eduction means, the openings are sized and spaced so that there is a constant hydraulic flow rate through each of the openings in a given eduction means. Tapered slots may also be used in place of the openings to produce the constant hydraulic flow rate at different locations along the length of the horizontal tube.

BRIEF DESCRIPTION OF SEVERAL VIEWS OF DRAWINGS

FIG. 1 is a fragmentary plan view of a sedimentation tank having the present invention incorporated therein;

FIG. 2 is an enlarged fragmentary sectional view of the upper end of one side wall and the adjacent end of the traveling bridge;

FIG. 3 is a vertical section taken along line 3—3 of FIG. 1;

FIG. 7 is a plan view similar to FIG. 1 showing a modified withdrawal means;

FIG. 8 is a vertical section similar to FIG. 4 showing the eduction means of FIG. 5 and speed control means of FIG. 7;

FIG. 9 is a fragmentary view of the horizontal tube taken along line 9—9 of FIG. 5;

FIG. 11 is a view similar to FIG. 9 showing another modified opening pattern.

DETAILED DESCRIPTION

Figure 4:
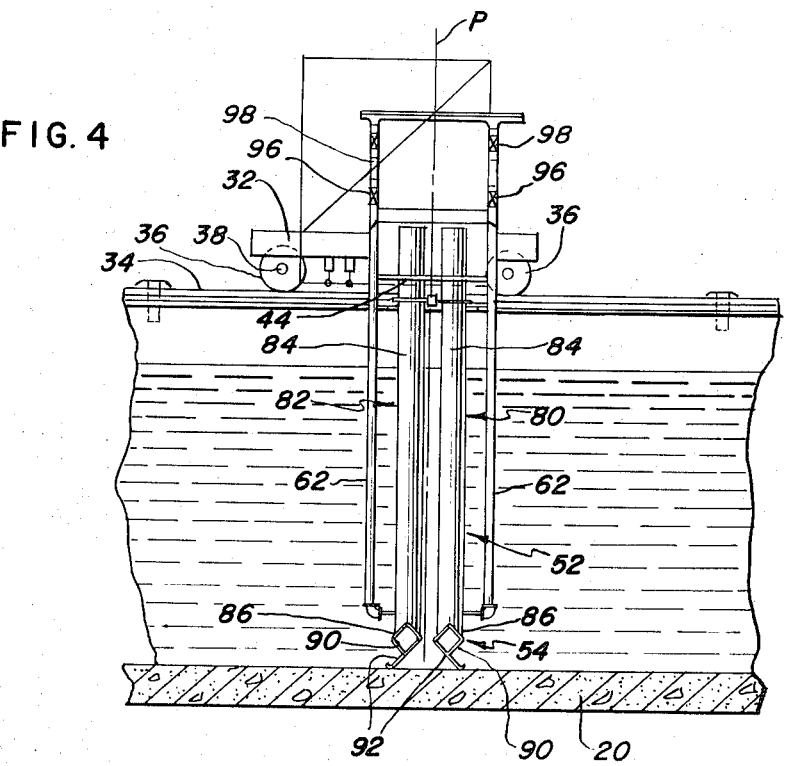
FIG. 4 is a fragmentary section taken generally along line 4—4 of FIG. 1.

While this invention is susceptible of embodiment in many different forms, there is shown in the drawings and will herein be described in detail several embodiments, with the understanding that the present disclosure is to be considered as an exemplification of the principles of the invention and is not intended to limit the invention to the embodiments illustrated.

FIG. 1 of the drawings shows a sedimentation or clarification tank 10 that is polygonal in cross-section and has opposed pairs of end walls 16, side walls 18 and a bottom 20 (FIG. 3).

Liquid with entrained solids is supplied to the tank through inlet or influent means 22 adjacent one end wall 16 and flows along the tank while suspended solids settle to the tank bottom 20 and clarified liquid is removed through the outlet or effluent means 24 adjacent the opposite end wall 16. The effluent end of the tank has a plurality of longitudinally extending weirs 26 that are supported in the tank by posts 28. Two weirs 26 that are located adjacent the opposed side walls 18 are carried by supports 28a.

The sedimentation tank or apparatus 10 further includes sludge removal apparatus 30 that is designed to remove a layer of settled solids from the bottom of the tank that includes a sludge layer and an associated amount of liquid. As indicated above, in many instances, it is desirable to maintain a relatively constant solids concentration in the activated sludge that is being returned to the aeration tank in order to increase treatment efficiency. It has been found that the sludge layer depth or solids concentration in the sludge layer varies along the length of the tank between the inlet and outlet ends 22 and 24 and that the depth of the sludge layer in the tank or solids concentration in the sludge layer at any given position between the inlet and outlet ends is a function of the sludge layer subsidence profile (sludge layer depth pattern) and the time elapsed since the sludge has been removed from that area of the tank. The sludge layer subsidence profile is dependent upon the size of the tank, the length to width ratio (the length being considered the direction of the flow of the liquid in the tank) and the influent and effluent end designs. With most influent and effluent end designs, it can be expected that more solids will be deposited on the tank bottom adjacent the influent end and the amount will progressively decrease as the distance from the influent end is increased. Thus, assuming a steady state condition where no sludge is being removed, the sludge layer subsidence profile between the influent and effluent ends would have a maximum depth adjacent the inlet end and a minimum depth adjacent the outlet end.

In most instances, it is highly desirable to remove all of the sludge layer that has accumulated in the bottom of the tank. Furthermore, to increase sewage treatment efficiency, the sludge layer must be removed without excessive mechanical agitation, which would result in the solids returning to the suspended state, and in a minimum period of time while still in the active state for return to the aeration tank.

According to the present invention, all of this is accomplished by a traveling bridge that is operated in a manner to remove all of the sludge layer with a constant concentration of solids in the return sludge from the bottom of the tank at the point where it is settled to eliminate chances of resuspension due to mechanical agitation. All of this is accomplished with a simple and efficient sludge removal mechanism.

As more clearly shown in FIGS. 1 and 4, the sludge removal apparatus or means 30 consists of a bridge or support means 32 supported for reciprocal movement on rails or guides 34 secured to the upper ends of side walls 18. The support for the bridge 32 consists of a plurality of rollers 36, two such pairs of rollers are utilized for supporting the bridge on each of the rails and the rollers are interconnected through shafts 38. One of the shafts 38 is driven by an adjustable speed reversible motor 40, the speed of which adjusted through speed control means 42, which will be described later.

The traveling bridge 32 supports a trough 44 that extends between opposed side walls 18 of the tank 10 and has its outlet end 46 located above a return sludge channel 48 that has an outlet 50 for returning activated sludge to the aeration tank for further treatment of sewage received in the tank. The sludge is delivered to the trough 44 by eduction means, generally designated at 52 in FIG. 4, that are supported on the bridge and extend downwardly towards the bottom of the tank with a substantially horizontal portion 54 located adjacent the bottom wall 20 of the tank to remove sludge in a manner to be described later.

In order to maintain a substantially constant flow of sludge through the eduction means 52, the sludge removal apparatus 30 further includes a blower 60 for supplying air to a point near the bottom of the eduction means through pipes 62. Since the creation of an upward flow of sludge in the pipes through the air lift concept is well known in the art, no detailed description appears to be necessary. Suffice it to say that the blower supplies a constant flow of air upwardly through the eduction means to produce a constant flow rate of an air-liquid mixture through the eduction means.

According to the present invention, the speed of travel of the bridge is correlated so as to be inversely proportional to the depth of the layer of sludge that is being removed at any given point along the length of travel thereof. Stated another way, the speed of the bridge is controlled as an inverse function of the depth of the layer of sludge in the bottom of the tank. This correlation of speed may be accomplished in many different ways and two examples will be given for purposes of completeness. One drive means, a commercially available unit, is an adjustable speed variable frequency AC drive, that includes a motor 40, which is an adjustable speed reversible AC motor, and speed control means 42 consisting of a static power converter that converts constant frequency line power to a variable frequency power source to drive the motor at various speeds.

The switching of the static power converter or speed control means 42 is accomplished through a limit switch 70 (FIG. 2) carried on the lower surface of the bridge 32 with a plurality of longitudinally spaced cams 72 supported on the upper end of one of the side walls 18 of the tank 10. The speed change limit switch 70 has an actuating arm 74 that is actuated each time the limit switch passes over one of the cams 72. The speed change limit switch in turn actuates a stepping switch to cause the current to flow through a different circuit in the static power converter 42 and adjust the frequency signal to the motor to result in a speed change in the motor. With this arrangement, the speed of the bridge can be correlated so as to be substantially inversely proportional to the depth of the sludge layer on the tank bottom at any given location along the tank. At the end of travel, the direction of the bridge 32 is reversed by a switch 76 that is actuated by a cam 78 and reverses the direction of rotation of the motor 40.

Assuming a sludge layer subsidence profile, as defined above, and further assuming that the traveling bridge has just reached the end of its path of travel adjacent the inlet end 22 for the tank and has been reversed by reversing switch 76, only a small sludge layer will have accumulated adjacent the inlet end of the tank since the eduction means has just traversed that area of the tank. However, as the distance from the inlet end increases, the amount of time that has lapsed since the eduction means has withdrawn settled solids from the given area has also increased, thereby resulting in a greater depth of sludge layer from the inlet end towards the outlet end.

To compensate for these variations in the depth of the sludge layer, the bridge is operated at a at a maximum speed as it leaves the inlet end of the tank and is progressively decreased in spaced increments or successive zones along the length of the tank, between opposed end walls 16, by appropriately spacing the cams 72. Thus, as the bridge progresses through the successive zones, the bridge speed progressively decreases to enable the eduction means to withdraw the increased amount of sludge layer that has accumulated since the last pass of the bridge. When the bridge reaches the opposite or outlet end adjacent end wall 16 and is reversed, the speed of travel of the bridge is again at a maximum and progressively decreases through the successive zones defined by the respective cams 72. The cams defining the respective zones can be spaced as desired and the speed of the bridge in each zone can also be set at any desired level. For example, the speed could first be at a maximum, reduced in steps intermediate opposite ends and then incareased as it approaches the opposite end or the speed could be reduced in equally spaced increments between opposite ends of the tank.

According to another aspect of the invention, the eduction means 52 is capable of removing all of the settled solids in either direction of travel of the bridge with a minimum amount of agitation of the layer of sludge. The construction and arrangement of the eduction means shown in FIGS. 1 through 4 is such that there are no relatively moving parts that are located below the surface of the liquid in the tank.

As more clearly shown in FIG. 4., the eduction means includes first and second conduit means 80 and 82 that are identical in construction and are located symmetrical to a substantially vertical plane P below the bridge. The first and second conduit means or eduction means 80 and 82 each consists of a vertical tube 84 (FIG. 4) having its upper end extending through the floor of the trough 44 and terminating below the upper edge of the trough. Each tube 84 terminates adjacent the bottom of the tank and has a horizontal tube portion 86 that extends substantially parallel to the bottom of the tank. Each horizontal portion 86 has a plurality of openings 90 for receiving deflected solids and a deflecting plate 92 extending downwardly from the horizontal portion.

In the specific illustrated embodiment, the horizontal portion 86 is polygonal or rectangular in cross-section with the deflecting plate 92 defining an extension of one of the sides of the tube and the openings 90 are located in the adjacent side of the tube. It will be noted that the two adjacent sides have an included angle of approximately 90° and each side defines an acute angle of substantially 45° with respect to the vertical plane P. Thus, the side of the tube having the openings 90 and the deflecting plate 92 cooperate to define a sludge receiving trough since the plate 92 extends downwardly and towards one of the end walls 16 while the side of the tube having openings 90 extends upward. The opposite conduit means 82 is identical in construction except that the openings 90 and the deflecting plate 92 are directed towards the opposite end wall 16 of the tank 10.

With this arrangement, one conduit means 80 will be collecting all of the sludge layer or solids as the bridge is traveling towards the outlet end of the tank while the second conduit means 82 will be collecting the sludge layer or solids as the bridge is traveling towards the inlet end. There is no need for having any relatively moving parts as was indicated above. The flow of sludge through the eduction means 52 is accomplished by the airlifts 62 discussed above. With the dual set of eduction means 80 and 82, suitable solenoid valves 96 would be located in each of the tubes 62 and actuated to open and close by the reversal switch 76 which also reverses the direction of travel of the bridge, to produce flow in the respective eduction means as the bridge travels in opposite directions.

According to a further aspect of the invention, the sludge removal apparatus is designed to be able to be installed in sedimentation tanks of varying widths. For this purpose, a plurality of first and second eduction means 80 and 82 are located at spaced positions on the bridge. The plurality of inverted T-shaped tubes have their horizontal portions 86 aligned transversely of the direction of movement of the bridge. This is more clearly shown in FIG. 3 wherein a fragmentary view of four sets of eduction means 80 and 82 is shown, and the sets of eduction means are supported on the bridge 32 (FIG. 4). Another advantage of having plural, transversely spaced individual eduction means is that the sludge removal apparatus can readily traverse the area between the weirs 26. A further advantage of having a plurality of individual eduction means transversely of the tank, is that the sludge flow rate through each individual withdrawal pipe can be regulated by individual control valves to accommodate any variations in sludge layer accumulation that might occur between the opposed side walls 18 of the tank. On FIG. 4 this is accomplished by the control valves 98 on the air feed line to the air lift. On FIG. 7 this is accomplished by the control valves 136 located on the eduction means.

Figure 5:
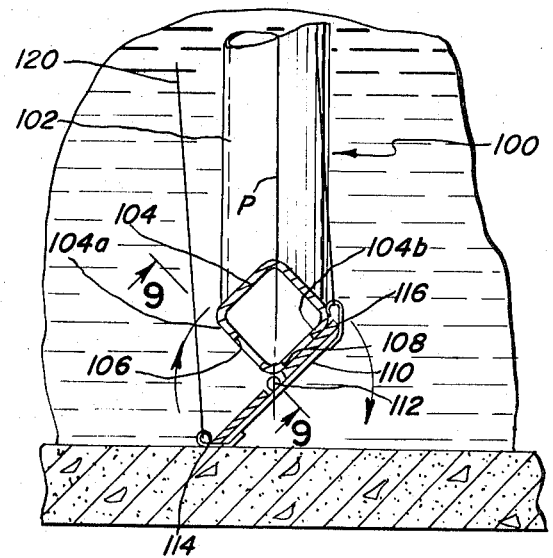
FIG. 5 is an enlarged fragmentary vertical section showing a slightly modified form of eduction means.

A slightly modified form of the eduction means is shown in FIG. 5 and is designed so that it is only necessary to have one inverted T-shaped tube or conduit means for removing sludge in either direction of travel of the bridge. The eduction means 100 of FIG. 5 includes an inverted T-shaped tube having a vertical portion 102 and a horizontal portion 104, which is preferably polygonal in cross sectional configuration for a purpose which will be described later. Two sides, 104a and 104b of the horizontal portion of the tube have a plurality of spaced openings 106 and 108 located therein. The respective groups of openings 106 and 108 are directed towards opposite ends or end walls 16 of the tank for receiving settled solids as the bridge travels in opposite directions on the tank.

The eduction means 100 further includes deflecting means 110 in the form of a deflecting plate pivoted about a fixed axis 112 below the horizontal portion 104 of the tube. The deflecting means or plate 110 has opposed edges 114 and 116 and the pivot axis 112 is located intermediate the opposite edges. The deflecting plate is capable of being moved between first and second positions wherein the respective edges 114 and 116 define leading edges that are located on opposite sides of the vertical plane P and the exposed portion of the plate extends towards the end wall 16 towards which the bridge is traveling. As will be seen from FIG. 5, in each of the two positions for the deflecting plate, one-half of the plate defines deflecting means for directing settled solids from the bottom of the tank towards one group of openings while the opposite half of the plate seals the other of the two groups of openings. Thus, when the bridge is traveling in the left hand direction as viewed in FIG. 1, the deflecting plate 110 would be in the position illustrated in which the openings 108 are sealed while the openings 106 are open and receive sludge from the bottom of the tank. When the direction of travel of the bridge is reversed, the deflecting plate 110 will be pivoted substantially 90° to seal the first group of openings 106 and accommodate sludge flow through the second group of openings 108.

The mechanism for reversing the position of the blade or moving the deflecting plate 110 between first and second positions may take many forms but a preferred mechanism is one in which the blade reversal occurs as a function of the reversal of direction of movement of the bridge travel. To accomplish these ends, the deflecting plate has a pair of cables 120 (FIG. 8) secured to opposite edges thereof and extending upwardly to the bridge 32. The upper ends of the cables are secured to opposite ends of a link 122 that is fixed intermediate its ends to a shaft 124. The shaft 124 (FIG. 7) is supported for rotation about a fixed axis on the bridge and is rotated by a reversible motor 126. A pair of limit switches 128 are located in the path of movement of the link. The motor 126 is energized by the reversing switch 76 (FIG. 2) at the end of travel of the bridge and moves the deflecting plate or blade from one extreme position to the other. At the other extreme position, one of the limit switches 128 interrupts the circuit to the motor. The motor and shaft may be termed a reversible drive mechanism carried by the bridge while the links 122 and cables 120 are the connecting means for adjusting the position of the deflecting blade.

As in the previous embodiment, four transversely spaced eduction means 150, to be described later, (FIG. 7) are utilized for a single tank and two sets of cables and links cooperate with opposite ends of each deflecting plate 110. In this instance, a positive displacement pump or self priming centrifugal pump rather than an air lift device is utilized for producing flow through the eduction means. As shown in FIG. 7, the withdrawal means consists of a pump 130 connected to a pair of eduction means 150 through a conduit 132 and a connector 134. The conduit 132 has a pair of control valves 136 located therein so that the rate of flow can be controlled individually through each of the eduction means 150 and the sludge is delivered to an outlet conduit 137. The second pair of eduction means 150 are likewise interconnected to a second pump in a similar manner. In both instances, the pump 130 is of the positive displacement or self-priming centrifugal type. If desired, a pump and outlet conduit can be provided for each eduction means 150. In addition, separate sampling ports 139 are provided for each eduction means 150.

In the alternate embodiment, the speed of the bridge is controlled as a function of the depth of settled solids in the bottom of the tank. For this purpose, one or more sensing probes 140 depend from the bridge to the bottom of the tank and are connected to the speed control means 42. Thus, the speed of the bridge is directly controlled as a function of the depth of the sludge layer in the bottom of the tank so that the speed of travel of the bridge is at all times inversely proportional to the depth of the sludge layer in the bottom of the tank.

While numerous types of circuitry could be utilized for controlling the speed of the bridge, one example would be to incorporate a compatible analog signal from the sensing probe 140 into the circuit to the motor controller which would adjust the frequency of the motor power supply and thereby drive the motor at varying speeds. The sensing probe 140, signal converter, motor control and drive motor would be operatively interconnected to control the speed of the motor as an inverse of the sludge layer depth.

Figure 6:
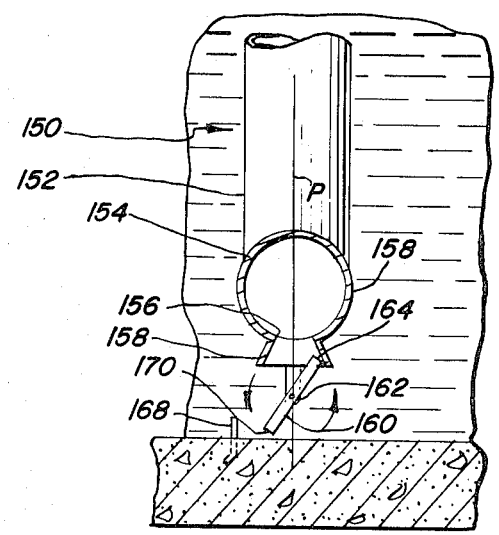
FIG. 6 is a view similar to FIG. 5 showing a further modified form of the eduction means.

A slightly further modified form of eduction means is shown in FIG. 6 and is similar in many respects to that shown in FIG. 5. The eduction means 150 of FIG. 6 consists of conduit means or an inverted T-shaped conduit having a vertical portion 152 extending up to the bridge and a horizontal portion 154 located adjacent the bottom of the tank. A single set of spaced openings 156 is located in the bottom of the tube and a pair of outwardly directed plates are fixed to the bottom of the tube adjacent the openings to define a trough for receiving sludge. A sludge deflecting plate 160 is pivoted intermediate opposite edges on a fixed pivot axis 162 to defined below the trough and the openings with the pivot axis and the centers of the openings 162 located along the vertical plane P. The upper edge 164 of the plate is located within the confines of the trough defined by the plates 158 while the lower edge is located in close proximity to the tank floor.

In the embodiment shown in FIG. 6, the mechanism for reversing the position of the deflecting plate or blade is incorporated into the bottom of the tank to eliminate the need for any movable elements to extend from the bottom to the top of the tank. In the illustrated embodiment, the mechanism for reversing the position of the plate consists of an abutment 168 extending above the floor adjacent each end of the tank. The abutment is located in the path of the leading edge 170 of the deflecting plate to cause an automatic reversal of the position of the blade at the end of travel of the bridge. Of course, two such abutment means will be located on opposite ends of the tank for each of the deflecting plates 160.

A plurality of eduction means 150 could be incorporated into a traveling bridge such as shown in FIG. 7 or alternatively, a plurality of eduction means 150 or 100 could be utilized with a traveling bridge and an air lift control such as shown in FIG. 1.

It is also desirable to have a constant hydraulic flow rate through each of the spaced openings in a given eduction segment. In utilizing an inverted T-shaped tube of the type described above, the pressure in the horizontal portion of the eduction segment will vary from the outer end toward the center where the vertical tube is connected to the horizontal tube. As a result the hydraulic flow rate will vary through the respective openings between opposite ends of the horizontal portion.

Figure 10:
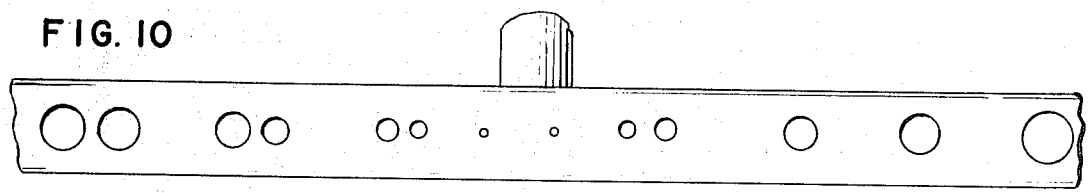
FIG. 10 (appearing with FIG. 4) is a view similar to FIG. 9 showing a modified opening pattern.

FIGS. 9, 10 and 11 show three different ways in which the constant hydraulic flow rate is achieved at different locations along the length of the horizontal portion of the eduction segment. In FIG. 9, the openings are equally spaced along the length of the horizontal tube and the size of the openings is progressively decreased in equal increments from the outer ends of the tubes to the center.

In the embodiment of FIG. 10, the constant hydraulic flow rate is achieved by openings of varying sizes that are not equally spaced. The spacing from the vertical tube is determined by the size of the opening and the pressure inside the tube at the opening. The advantage of unequal spacing is that standard drill bit sizes can be used to produce the openings.

In the embodiment of FIG. 11, the openings are in the form elongated tapered slots along the length of the horizontal tube 202. The taper of each slot is correlated with the pressure developed inside the tube at different locations along the length thereof to maintain the constant hydraulic flow rate. The tapered slots have a minimum dimension adjacent the vertical portion 204 of the eduction segment and each slot has a progressively increasing dimension towards the outer end of the horizontal tube 202.

The three forms of openings shown in FIGS. 9, 10 and 11 may be used for any of the sets of openings in the respective eductor segments shown and described.

It should also be noted that either the incremental change in bridge speed travel or the infinitely variable change in bridge speed travel could be utilized with any of the eduction means shown.

We claim:

1. In a rectangular sedimentation tank having a bottom and side walls with inlet means for supplying liquid with entrained solids to said tank and outlet means spaced from said inlet means for receiving clarified liquid while the solids are deposited on said bottom to form a sludge layer, sludge removal apparatus comprising parallel guide means supported on a pair of side walls; a bridge supported for reciprocal movement on said guide means between opposite ends of said tank; eduction means supported on said bridge and having a substantially horizontal portion adjacent said bottom wall and extending between said pair of side walls; flow producing means cooperating with said eduction means; reversible variable speed drive means for traversing said bridge; control means cooperating with said drive means to move said bridge; and means cooperating with said control means for controlling the speed of said bridge as an inverse function of the depth of the sludge layer to remove substantially the entire sludge layer and maintain a substantially uniform concentration of solids in the sludge flowing through said eduction means.

2. The combination as defined in claim 1, in which said means cooperating with said control means progressively decreases the speed of travel of said bridge from one end of said tank to the opposite end.

3. The combination as defined in claim 2, in which the speed of travel of said bridge is decreased in steps between opposite ends of said tank.

4. The combination as defined in claim 1, in which said means cooperating with said control means includes means for sensing the depth of the sludge layer and cooperating with said control means for varying the speed of said bridge as a function of the sludge layer on the bottom of the tank.

5. The combination as defined in claim 1, in which said flow producing means includes means for introducing a gas under pressure into said eduction means at a point near the tank bottom to maintain a constant flow rate through said eduction means.

6. The combination as defined in claim 1, in which said flow producing means includes a pump supported on said bridge and cooperating with said eduction means to maintain a constant flow rate through said eduction means.

7. A sludge removal apparatus for a tank having inlet means for supplying liquid with entrained solids to said tank and outlet means spaced from said inlet means for receiving clarified liquid while solids are deposited on the bottom of said tank comprising: eduction means having a horizontal portion adjacent the bottom of said tank, said horizontal portion including a tube having a plurality of spaced openings; support means for supporting said eduction means for movement in opposite directions in said tank; drive means for traversing said support means; a solids deflecting plate pivoted about a fixed axis below said tube, said deflecting plate having first and second positions for directing solids to said openings; and means for moving said solids deflecting plate between said positions at opposite ends of travel of said support means.

8. The combination as defined in claim 7, in which said tube is substantially rectangular and said openings are located in adjacent sides of said tube, and in which said plate is pivoted between first and second positions about a fixed axis below the bottoms of said sides, said plate closing some of said openings in each of said positions while directing solids to the remaining openings.

9. The combination as defined in claim 7, in which all of said openings are axially aligned adjacent the bottom of said tube and in which said pivot axis for said plate is located substantially in vertical alignment with the axis of said tube and the centers of said openings.

10. The combination as defined in claim 9, further including means defining a trough below said openings with the upper edge of said plate located in said trough.

11. The combination as defined in claim 7, in which said means for moving said solids deflecting plate includes fixed abutments on the bottom of said tank in the path of movement of said deflecting plate.

12. The combination as defined in claim 7, in which said means for moving said solids deflecting plate includes a reversible drive mechanism carried by said bridge and connecting means between said reversible drive mechanism and said deflecting plate.

13. In a sedimentation tank having an inlet for supplying solids entrained liquid and an outlet for receiving clarified liquid while the solids settle on the tank bottom, means for removing said settled solids comprising first and second eduction means; support means for said eduction means; drive means for moving said support means in opposite directions on said tank, each of said eduction means including a tube having a vertical portion and a horizontal portion, said horizontal portions each having a plurality of spaced openings respectively directed towards the respective directions of movement of said support means; and a deflecting plate fixed to each of said horizontal portions, said deflecting plates respectively extending downwardly from said horizontal portions and towards the respective directions of movement of said support means so that settled solids are directed to one eduction means while said support means is moving in one direction and the other eduction means while moving in the opposite direction.

14. The combination as defined in claim 13, in which said tank is rectangular with said support means being moved between opposed side walls and in which each eduction means includes a plurality of inverted T-shaped tubes with horizontal portions aligned transversely of the direction of movement.

15. The combination as defined in claim 13, in which said horizontal portions of said eduction means are polygonal tubes with said plates defining an extension of one of the sides of said tubes and with the openings located in an adjacent side.

16. A method of removing settled solids from the bottom of a polygonal settling tank by eduction means extending across the bottom of the tank which comprises the steps of reciprocating said eduction means between opposed side walls of said tank; maintaining a substantially constant flow of sludge through said eduction means; and varying the speed of travel of said eduction means as a function of the depth of the sludge layer to maintain a substantially uniform solids concentration in the sludge passing through said eduction means.

17. The method as defined in claim 16, in which the speed of said eduction means is progressively decreased as it is traveling between said sides.

18. The method as defined in claim 17, in which said eduction means leaves one of said side walls at a maximum speed of travel and progressively decreases in steps while traveling toward the opposed side wall.

19. The method as defined in claim 16, further including the step of sensing the depth of the layer of sludge on the tank bottom and varying the bridge speed as a function of the depth of the sludge layer.

* * * * *